(12) United States Patent
Solc

(10) Patent No.: US 11,764,524 B2
(45) Date of Patent: Sep. 19, 2023

(54) TERMINAL CONNECTOR

(71) Applicant: TDK-LAMBDA UK LIMITED, Ilfracombe (GB)

(72) Inventor: Radoslav Solc, Ilfracombe (GB)

(73) Assignee: TDK-LAMBDA UK LIMITED, Ilfracombe (GB)

( * ) Notice: Subject to any disclaimer, the term of this patent is extended or adjusted under 35 U.S.C. 154(b) by 0 days.

(21) Appl. No.: 17/480,645

(22) Filed: Sep. 21, 2021

(65) Prior Publication Data

US 2022/0094119 A1 Mar. 24, 2022

(30) Foreign Application Priority Data

Sep. 24, 2020 (GB) .................................... 2015120

(51) Int. Cl.
| | | |
|---|---|---|
| *H01R 13/7197* | (2011.01) | |
| *H01R 12/53* | (2011.01) | |
| *H01R 12/58* | (2011.01) | |
| *H02M 3/00* | (2006.01) | |

(52) U.S. Cl.
CPC ......... *H01R 13/7197* (2013.01); *H01R 12/53* (2013.01); *H01R 12/58* (2013.01); *H02M 3/003* (2021.05)

(58) Field of Classification Search
CPC .... H01R 13/7197; H01R 12/53; H01R 12/58; H01R 13/719
See application file for complete search history.

(56) References Cited

U.S. PATENT DOCUMENTS

| | | | | |
|---|---|---|---|---|
| 8,063,728 | B2 * | 11/2011 | Brunel | .................... H01F 37/00 336/200 |
| 9,379,493 | B2 * | 6/2016 | Aizawa | ............. H01R 13/6588 |
| 10,636,556 | B2 * | 4/2020 | Ishihara | ............. H01F 27/2847 |

FOREIGN PATENT DOCUMENTS

| | | | |
|---|---|---|---|
| CN | 205248027 U | | 5/2016 |
| CN | 105763038 A | | 3/2019 |
| JP | 2012079443 A | * | 4/2012 |
| JP | 2012079443 A | | 4/2012 |

OTHER PUBLICATIONS

JP 2012079443 A Machine Translation.*
UK Intellectual Property Office, Search Report under Section 17(5), Application No. GB2015120.5 (dated Mar. 25, 2021).

* cited by examiner

*Primary Examiner* — Oscar C Jimenez
*Assistant Examiner* — Paul D Baillargeon
(74) *Attorney, Agent, or Firm* — GURR BRANDE & SPENDLOVE, PLLC.; Robert Spendlove

(57) ABSTRACT

A terminal connector for attachment to a circuit board. The terminal connector comprises first and second terminals, each comprising a connection end for connection to respective contacts in the circuit board and a wire attachment formation for connecting a wire to the respective terminal. The terminal connector further comprises a ferrite core surrounding a section of both the first and second terminals between their terminal contacts and wire attachment formations. The ferrite core is directly connected to the terminals and is secured to the circuit board by the terminals when their connection ends are connected to the respective contacts in the circuit board.

14 Claims, 4 Drawing Sheets

TERMINAL CONNECTOR

This application claims priority to United Kingdom Patent Application No. GB 2015120.5 filed on Sep. 24, 2020 and entitled "TERMINAL CONNECTOR." The entire content of this application is incorporated herein by reference.

The present invention concerns a terminal connector and, in particular, a terminal connector for use on a switch mode power supply and a switch mode power supply comprising the terminal connector.

Switch-mode power supplies are known to generate unwanted electromagnetic emissions. Common mode noise presents a particular problem with such circuits, resulting in high frequency currents flowing through the ground connection and returns to the power supply line.

To address the above issue, it is common to provide a ferrite clamp or choke on the input or output cables for reducing radiated emissions. FIG. 1 shows a top view of such a conventional connector and ferrite clamp arrangement in which the ferrite clamp 5 is used in conjunction with a switch-mode power supply circuit 1. As shown, the power supply circuit is provided in the form of a printed circuit board, PCB, 1 comprising a plurality of electronic components 9. The PCB 1 is provided with positive terminal 2 and negative terminal 8 which are connected to circuit contacts in the PCB 1, and onto which the wire connectors 3,7 of wires 4,6 are respectively connected. The ferrite clamp 5 is then provided as a two-part ferrite core secured around the wires 4,6 by a plastic cradle.

There are however there are a number of downsides associated with ferrite clamps. In particular, due to the complexities of power supply technologies, it is common in the electronics industry for power supply circuits to be made by a specialist power supply manufacturer. Power supplies are then sold to consumer product manufacturers, who will incorporate these circuits into an electronic assembly for commercial sale. However, as a consequence, the burden of providing a suitable ferrite core falls on the end product manufacturers, rather than the power supply manufacturer. As such, in addition to requiring the incorporation of a relatively bulky component on the power supply's external wiring, it is also left to the end product manufacturers to meet the associated cost and space requirements.

To address the above, an alternative arrangement developed by the applicant is shown in FIG. 2 in a perspective view. With this arrangement, the PCB terminals 2,8 are provided as vertically orientated bus-bars. It will be understood that "vertical" refers to a plane substantially perpendicular to the plane of the PCB 1, such that if the PCB 1 is horizontal, parts on top of the PCB surface project vertically upwards. A plastic bobbin 10 is used to support two E-shaped Manganese-Zinc ferrite core parts 11 around the bus-bars 2,8. Glue 12 is used to mate the parts together. This arrangement allows the footprint of the ferrite core 11 to be provided on the PCB 1. However, such an arrangement still has a number of disadvantages. For instance, the plastic bobbin 10 is relatively bulky, but is required both to secure the two ferrite E cores 11 and to isolate the conductive bus-bars 2,8 from the Mn—Zn ferrite core 11 material.

The present invention therefore seeks to address the above issues with the prior art.

According to a first aspect of the present invention there is provided a terminal connector for attachment to a circuit board, comprising: first and second terminals each comprising a connection end for connection to respective contacts in the circuit board and a wire attachment formation for connecting a wire to the respective terminal; and a ferrite core surrounding a section of both the first and second terminals between their terminal contacts and wire attachment formations, wherein the ferrite core is directly connected to the terminals and is secured to the circuit board by the terminals when their connection ends are connected to the respective contacts in the circuit board.

In this way, embodiments of the invention provide a terminal connector with an integrated ferrite core. In use, the terminals may thereby hold the ferrite core in place on or above the circuit board surface, and between the circuit board contact and the external wiring. This provides a compact arrangement because it allows a portion of the vertical footprint of the ferrite core to be occupied by the terminals and their wire attachment formations. In addition, it also allows the ferrite core to be incorporated into the PCB design. That is, in embodiments, the power supply circuit itself can incorporate the means to reduce common mode noise emissions, rather than placing this burden on, for example, the end product manufacturer. At the same time as the above, the direct connection between the terminals and the ferrite core avoids the need for insulation around the terminals because the core is not conductive. This absence of insulation, in combination with the narrow pin arrangement provided by the assembly allows for a short magnetic path and, consequently, the ferrite core is able to achieve a higher impedance for a given volume. As such, a smaller ferrite core may be provided, whilst achieving a comparable impedance to larger conventional arrangements.

In embodiments, the ferrite core is an integral body and comprises an aperture thorough which the sections of first and second terminals are received. In this way, the ferrite core may be provided as a single piece, and thereby avoid the need for joints or air gaps, which may otherwise reduce the impedance of the core.

In embodiments, the ferrite core is formed of a Nickel-Zinc ferrite material. Nickel-Zinc ferrite advantageously has a high electrical resistance and therefore prevents the conduction of currents between the terminals.

In embodiments, the ferrite core comprises an oval shaped cross section. In this way, the ferrite core may be provided with a flattened tube shape, with the conductive terminals being accommodated through the central channel. In other embodiments, the ferrite core comprises a rectangular shaped cross section.

In embodiments, the first and second terminals each comprise a core connection section for extending vertically up from the circuit board when the connection ends are connected to the respective contacts, and wherein the ferrite core is directly connected to the core connection sections. In this way, the core connection sections may be shaped to be received into the ferrite core and configured to orientate the core relative to the circuit board.

In embodiments, the longitudinal axis of the ferrite core is oriented vertically from the circuit board when the connection ends are connected to the respective contacts. In this way, the vertical footprint occupied by the ferrite core on the circuit board is minimised. As such, the size of the circuit board may be minimised.

In embodiments, the first and second terminals are configured to support the ferrite core above the circuit board. In this way, no additional support structures are needed, thereby minimising costs.

In embodiments, the first and second terminals are configured to support the ferrite core within the perimeter of the circuit board. In this way, the ferrite core can be accommodated within the interior of the circuit board.

In embodiments, each of the first and second terminals further comprises a support end distal to the connection end and being for engagement with the circuit board when the connection ends are connected to the respective contacts for supporting the terminal. In this way, the terminals may be provided as an arched structure, with two legs connected to the circuit board for supporting the ferrite core there above.

In embodiments, the first and second terminals comprise a metal plate. In this way, the terminals may be machined from sheet metal and then bent to shape.

In embodiments, the first and second terminals are configured such that their wire attachment formations are oriented vertically when the connection ends are connected to the respective contacts. In this way, the footprint occupied by the terminals on the circuit can be minimised.

In embodiments, the first and second terminals are configured such that the wire attachment formations are located substantially inline with the perimeter of the circuit board. In this way, the wire attachment points can be located adjacent to the edge of the circuit board. Furthermore, in the case of vertically orientated wire attachment formations, this may allow board-to-board connections to be established between the wire connection formations of adjacent boards.

In embodiments, the first and second terminals each further comprise a second wire attachment formation. In this way, a standardised terminal connector may be provided which allows for various connection configurations.

In embodiments, the first and second terminals are mechanically engaged by an internal surface of the ferrite core defining an aperture there through. The first and second terminals may be held a distance apart to define an air gap there between.

According to a second aspect of the present invention, there is provided a switch mode power supply comprising a terminal connector according to any of the above statements.

Illustrative embodiments of the present invention will now be described with reference to the accompanying drawings in which:

FIG. 3 shows a connector 13 according to an illustrative embodiment of the invention, with FIG. 3A showing a side view, FIG. 3B showing a front view, and FIG. 3C showing a bottom perspective view.

Figure 1:
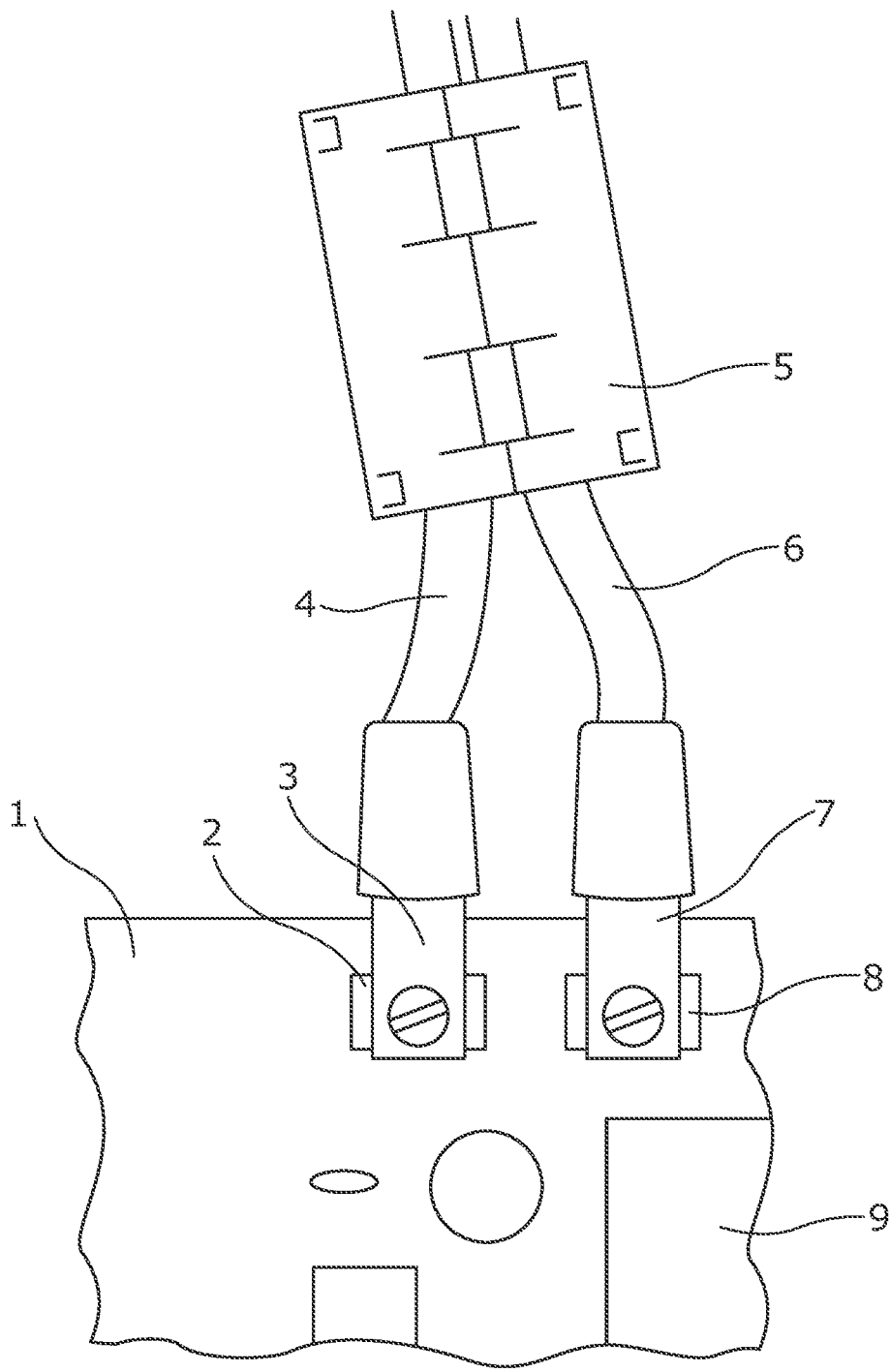
FIG. 1 shows a top view of a conventional connector and ferrite clamp arrangement.
Figure 2:
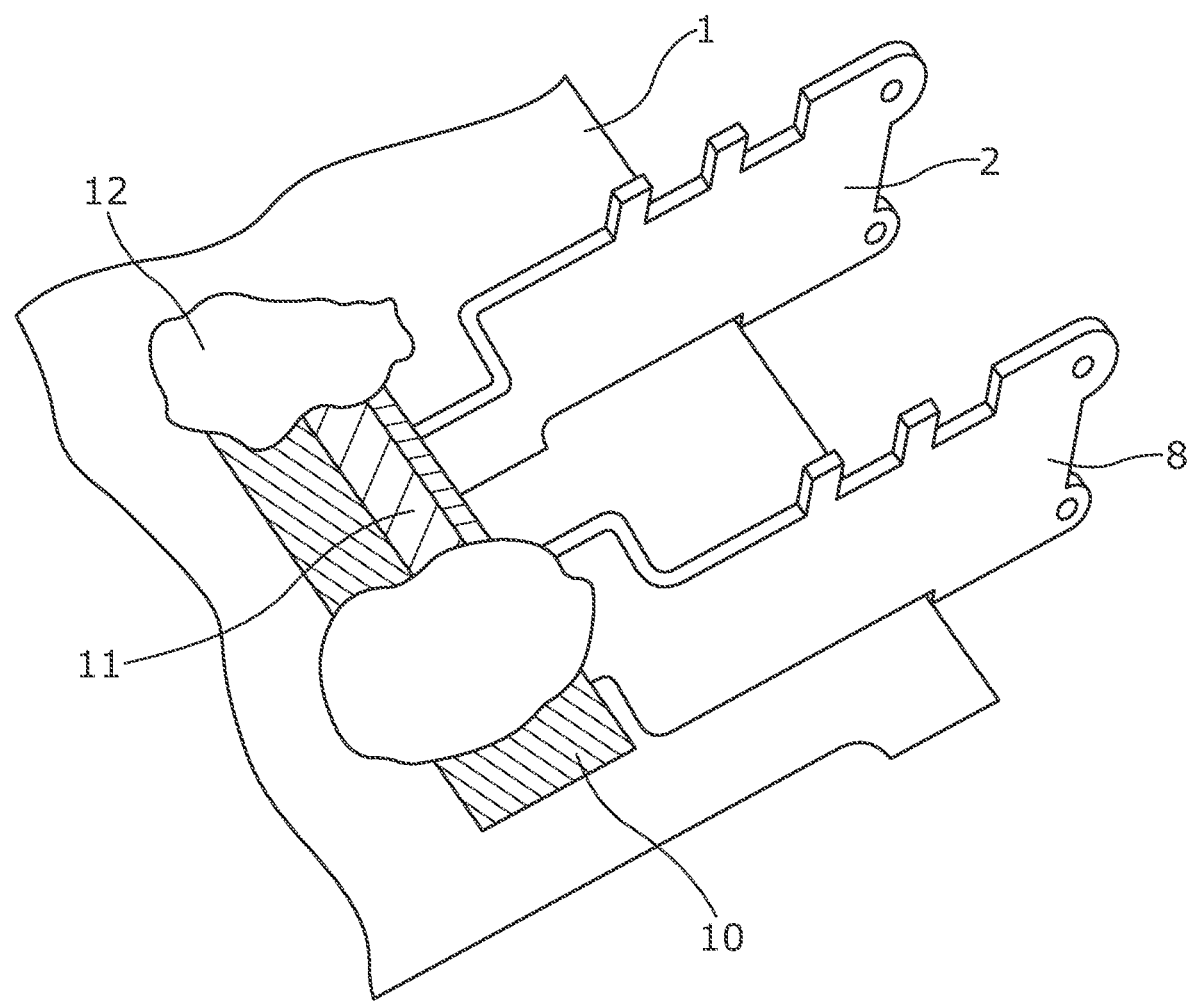
FIG. 2 shows a perspective view of an alternative connector arrangement.

The connector 13 comprises first and second terminal formations 2,8 and a ferrite core 18. The first and second terminal formations 2,8 each have an inverted U-shape configuration, with two legs 16,17 spaced by an upper connecting part 14 forming a flattened arch at the top. In this embodiment, the connecting parts 14 and the outer legs 16 of the first and second terminal formations 2,8 are each provided with a screw aperture 15 for allowing a wire connector to be connected thereto. The bottom of each leg is also provided with pins 20 for connection to a PCB.

The ferrite core 18 is provided as vertically extending body with an oval shaped horizontal cross section. An oval shaped aperture 19 is provided through the centre of the ferrite core 18, with the inner legs 17 of the first and second terminal formations 2,8 extending through the aperture 19. As such, the ferrite core 18 surrounds the inner legs 17 of the terminal formations 2,8, with the two terminal formations 2,8 spaced apart by an air gap 21.

The ferrite core 18 is formed as a single piece of Nickel-Zinc ferrite material. The Nickel-Zinc ferrite material has a high electrical resistivity and therefore the two terminal formations 2,8 may connect to the ferrite core material, without the need for additional insulation surrounding them.

Figure 3A:
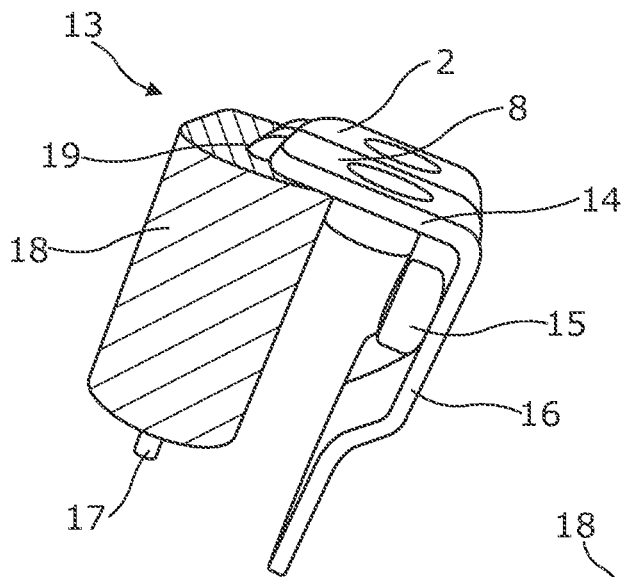
FIG. 3A shows a side view of a connector according to an illustrative embodiment of the invention.
Figure 3B:
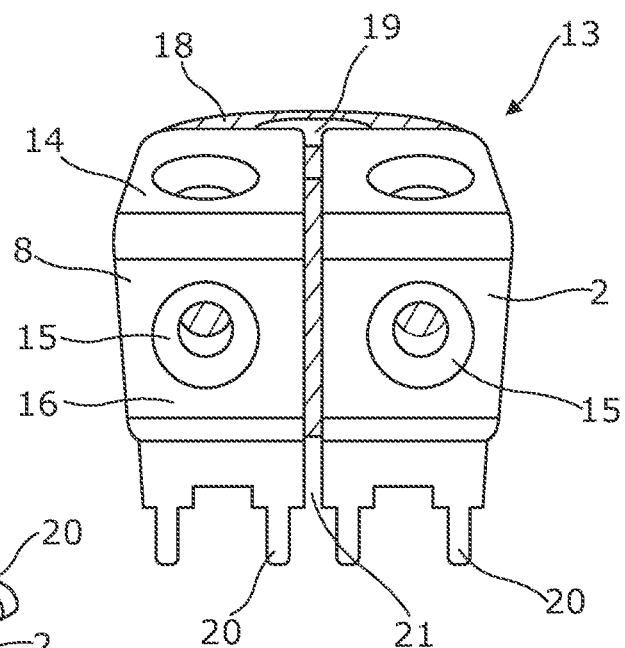
FIG. 3B shows a front view of the connector shown in FIG. 3A.
Figure 3C:
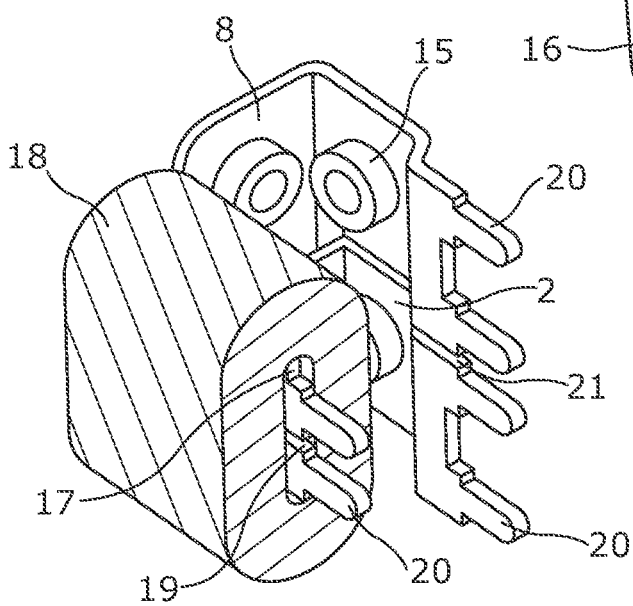
FIG. 3C Shows a bottom perspective view of the connector shown in FIG. 3A.
Figure 4:
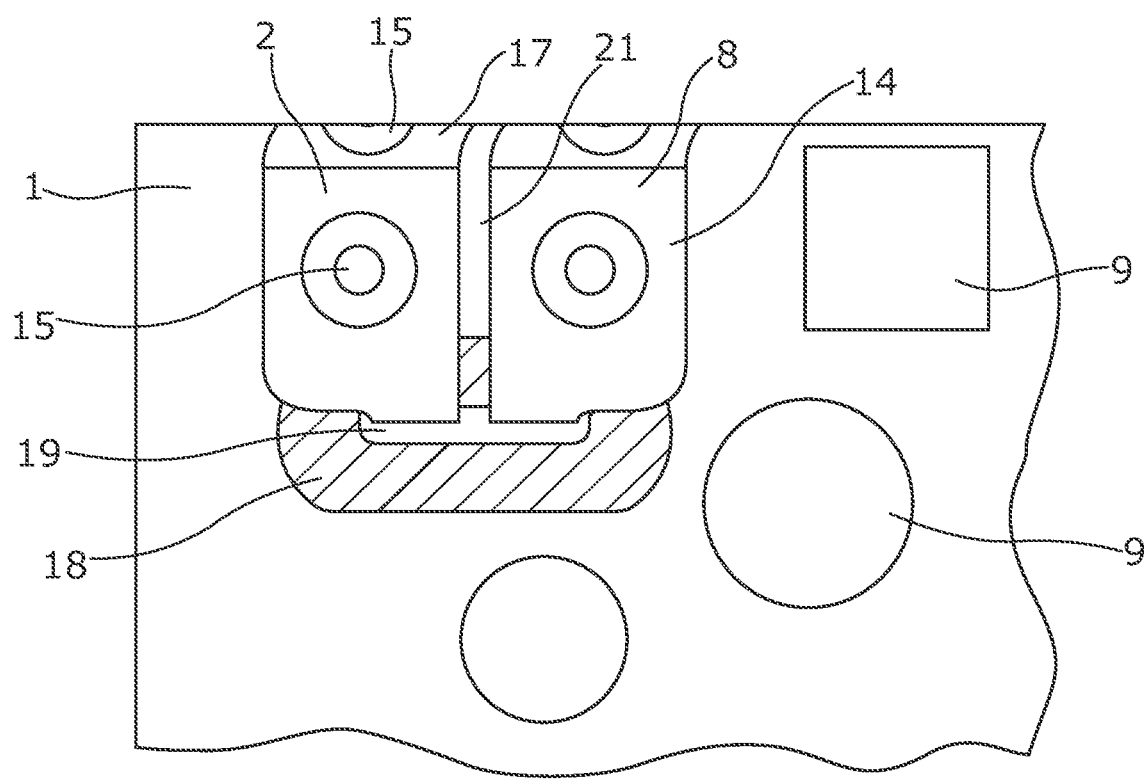
FIG. 4 shows a top view of the connector shown in FIG. 3A when integrated into a circuit board.

FIG. 4 shows a top view of the connector 13 shown in FIG. 3 when integrated into a circuit board 1. The pins of each leg 16,17 slot into corresponding apertures provided in the printed circuit board 1 such that the connector 13 is seated on the circuit board's upper surface, with the outer legs 16 facing outward and being substantially in line with the edge of the circuit board 1. The pins 20 are soldered to secure the connector 13 to the circuit board 1.

The inner legs 17 of the two terminal formations 2,8 are oriented toward the interior of the circuit board. The pins 20 of the inner legs 17 electrically connect to the circuit components 9 on the printed circuit board 1 such that their respective terminal formations 2,8 form the wire connectors to which the power supply wires may be connected.

As shown in FIG. 4, once the connector 13 is connected to the circuit board 1, the terminal formations 2,8 provide two vertical screw apertures 15 provided on the outer legs 16, located at outer boundary of the circuit board 1. The terminal formations 2,8 also provide two horizontal screw apertures 15 provided on the connecting parts 14, located adjacent to the outer boundary of the circuit board 1. Consequently, power supply wires may be connected to the terminals 2,8 using either the horizontal or vertical screw apertures 15 on each terminal. The provision of vertical screw apertures 15 aligned with the outer edge of the circuit board 1 also allow board-to-board connections to be established with another circuit board placed next to the circuit board 1.

At the same time as the above, the ferrite core 18 is oriented vertically and surrounds the terminal formations 2,8 between their electrical connection to the circuit board 1 and the screw apertures 15. As such, current flowing between the circuit and the power supply wires passes along terminal formations 2,8, though the ferrite core 18, which thereby acts to reduce the radiated emissions.

As the ferrite core 18 is made of a single piece, as compared to the split core found in cable clamps and the two E cores found in the bus bar arrangement, the core 18 provides the highest possible impedance for the given volume of ferrite. That is, as the ferrite core 18 contains no joints or air gap, a high impedance to common mode noise is achieved.

In addition, as the two terminal formations 2,8 do not require insulation, a shorter magnetic length is achieved. As a consequence, a relatively small ferrite core 18 is able to achieve impedance comparable to a much larger ferrite cable clamp because of their similar ratios of magnetic length to magnetic area. In effect, there can be a quadratic reduction in the ferrite's volume, whilst maintaining the same impedance due to the shorter magnetic length. The lack of insulation also allows for easier component assembly.

The configuration of the ferrite core 18 and the terminal formations 2,8 is also space efficient in terms of footprint on the circuit board 1. In particular, as shown in FIG. 4, around half the footprint of the space of ferrite core 18 is accommodated within the space of the terminals 2,8.

The combination of the above space saving factors also allows for a number of cost savings. For example, not only is assembly more cost-effective owing to the integration of the ferrite core 18 onto the circuit board 1, but there is no need for insulation materials, and smaller volumes of connector, terminal, and PCB materials are needed. At the same time, noise attenuation is comparable to larger existing solutions. Importantly, as the ferrite core 18 can be integrated onto a power supply circuit board 1, the end product manufacturers can be relieved of the cost and space burden of providing a suitable ferrite core.

It will be understood that the embodiment illustrated above shows applications of the invention only for the purposes of illustration. In practice the invention may be applied to many different configurations, the detailed embodiments being straightforward for those skilled in the art to implement.

The invention claimed is:

1. A terminal connector for attachment to a circuit board, comprising:
   first and second terminals each comprising a connection end for connection to respective contacts in the circuit board and a wire attachment formation for connecting a wire to the respective terminal; and
   a ferrite core surrounding a section of both the first and second terminals between their terminal contacts and wire attachment formations,
   wherein the ferrite core is directly connected to the terminals and is secured to the circuit board by the terminals when their connection ends are connected to the respective contacts in the circuit board, and
   wherein the ferrite core is an integral body and comprises an aperture thorough which the sections of first and second terminals are received.

2. A terminal connector according to claim 1, wherein the ferrite core is formed of a Nickel-Zinc ferrite material.

3. A terminal connector according to claim 1, wherein the ferrite core comprises an oval shaped cross section.

4. A terminal connector according to claim 1, wherein the first and second terminals each comprise a core connection section for extending vertically up from the circuit board when the connection ends are connected to the respective contacts, and wherein the ferrite core is directly connected to the core connection sections.

5. A terminal connector according to claim 4, wherein the longitudinal axis of the ferrite core is oriented vertically from the circuit board when the connection ends are connected to the respective contacts.

6. A terminal connector according to claim 1, wherein the first and second terminals are configured to support the ferrite core above the circuit board.

7. A terminal connector according to claim 6, wherein the first and second terminals are configured to support the ferrite core within the perimeter of the circuit board.

8. A terminal connector according to claim 1, wherein each of the first and second terminals further comprises a support end distal to the connection end and being for engagement with the circuit board when the connection ends are connected to the respective contacts for supporting the terminal.

9. A terminal connector according to claim 1, wherein the first and second terminals comprise a metal plate.

10. A terminal connector according to claim 1, wherein the first and second terminals are configured such that their wire attachment formations are oriented vertically when the connection ends are connected to the respective contacts.

11. A terminal connector according to claim 10, wherein the first and second terminals are configured such that the wire attachment formations are located substantially inline with the perimeter of the circuit board.

12. A terminal connector according to claim 1, wherein the first and second terminals each further comprise a second wire attachment formation.

13. A terminal connector according to claim 1, wherein the first and second terminals are mechanically engaged by an internal surface of the ferrite core defining an aperture there through.

14. A switch mode power supply comprising a terminal connector according to claim 1.

* * * * *